Sept. 1, 1959        P. A. JOHNSON        2,901,964
VENDING MACHINE Filed Feb. 4, 1957                               8 Sheets-Sheet 1

FIG. 1.

INVENTOR.
PHILIP A. JOHNSON

ATTORNEY

Sept. 1, 1959  P. A. JOHNSON  2,901,964
VENDING MACHINE
Filed Feb. 4, 1957  8 Sheets-Sheet 5

INVENTOR.
PHILIP A. JOHNSON
BY
ATTORNEY

INVENTOR.
PHILIP A. JOHNSON
BY
ATTORNEY

United States Patent Office 2,901,964
Patented Sept. 1, 1959

2,901,964

VENDING MACHINE

Philip A. Johnson, Van Nuys, Calif., assignor, by direct and mesne assignments, of forty-seven percent to Lloyd F. Brogan, Santa Ana, and six percent to Richard L. Gausewitz, Orange, Calif.

Application February 4, 1957, Serial No. 637,936

15 Claims. (Cl. 99—352)

This invention relates to a vending machine, and more particularly to a coin-operated apparatus for storing perishable sandwiches under refrigeration and then vending them in cooked and heated condition.

Machines have previously been constructed for vending perishable sandwiches in a heated condition, after storage thereof, but such machines were relatively complicated and expensive and were characterized by a number of important defects. One defect relative to at least one of such prior vending machines was that each sandwich was necessarily contained in a specially constructed and coated cylinder, which would remain perfect in shape and size during storage thereof. If an inexpensive, uncoated paper cylinder were employed in place of such special cylinder, such uncoated paper cylinder would tend to lose its cylindrical shape during storage and result in jamming and mis-operation of the vending apparatus. Since the cylinders were dispensed with the sandwiches and thus lost, and since they cost in the nighborhood of two cents each, it will be appreciated that the necessity for employing such special cylinders greatly increased the cost of the operation.

Further important defects of prior vending machines of the type indicated related to the fact that the maintenance men or operators tended to load them in such a way that the old, previously stored sandwiches were separated from the vending or feeding elements by newly loaded sandwiches, with the result that after a number of such loadings the older sandwiches would spoil despite the refrigeration under which they were kept. Additional defects related to the necessity for pushing the sandwiches into the cooking means instead of conveying them therethrough, and to the necessity for employing relatively large and expensive actuators or motors for the moving components.

An extremely important defect of prior sandwich vending machines was that it was impractical or impossible to provide for the selective vending of more than one type of sandwich, with the result that customers frequently tired of the single sandwich dispensed at a given vending machine location and accordingly withheld their business.

In view of the above and other factors characteristic of vending machines of the type specified, it is an object of the present invention to provide a relatively simple, inexpensive and reliable vending machine which will vend a plurality of types of cooked sandwiches, which does not require that the sandwiches be stored in expensive cylinders or other containers, which will vend different sizes of sandwiches without substantial danger of jamming, and which is characterized by a very short vending and cooking cycle.

An additional object is to provide a sandwich vending machine which will always vend the oldest sandwiches first, despite any tendency toward laziness or inefficiency on the part of the loading operators, so that the danger of spoilage is minimized or eliminated.

A further object is to provide a vending machine incorporating highly efficient, yet relatively simple, mechanism for feeding sandwiches from the storage chamber into the cooking chamber.

Another object is to provide a vending machine in which refrigerated sandwiches are individually conveyed into an inductance cooking chamber on a special conveyor which passes through the chamber, as distinguished from being merely pushed into the cooking chamber by external means.

A further object is to provide a vending machine incorporating a novel gate mechanism which is so constructed that the gates need never lift the stack of sandwiches to be vended, whereby extremely small and economical motors may be employed for operation of the gates.

A further object is to provide a sandwich vending machine in which a sandwich is always disposed immediately adjacent the cooking chamber for rapid transmission thereof into such a chamber a very short period of time after the coins are inserted, whereby substantially all of the operating time of the machine is taken up by cooking of the sandwich instead of by vending.

An additional object is to provide a machine the feeding and conveying elements of which are so constructed that it will take sandwiches of different sizes, in extremely inexpensive containers, without the necessity of any adjustment operations and without substantial danger of jamming.

A further object is to provide a vending machine incorporating, in a very small space, mechanism for effecting vending and cooking of sandwiches of different types as desired by the customer.

A further object is to provide a vending apparatus which will efficiently cook a hot dog in a conventional hot dog bun.

These and other objects and advantages of the invention will be more fully set forth in the following specification and claims, considered in connection with the attached drawings to which they relate.

General description

Figure 1:
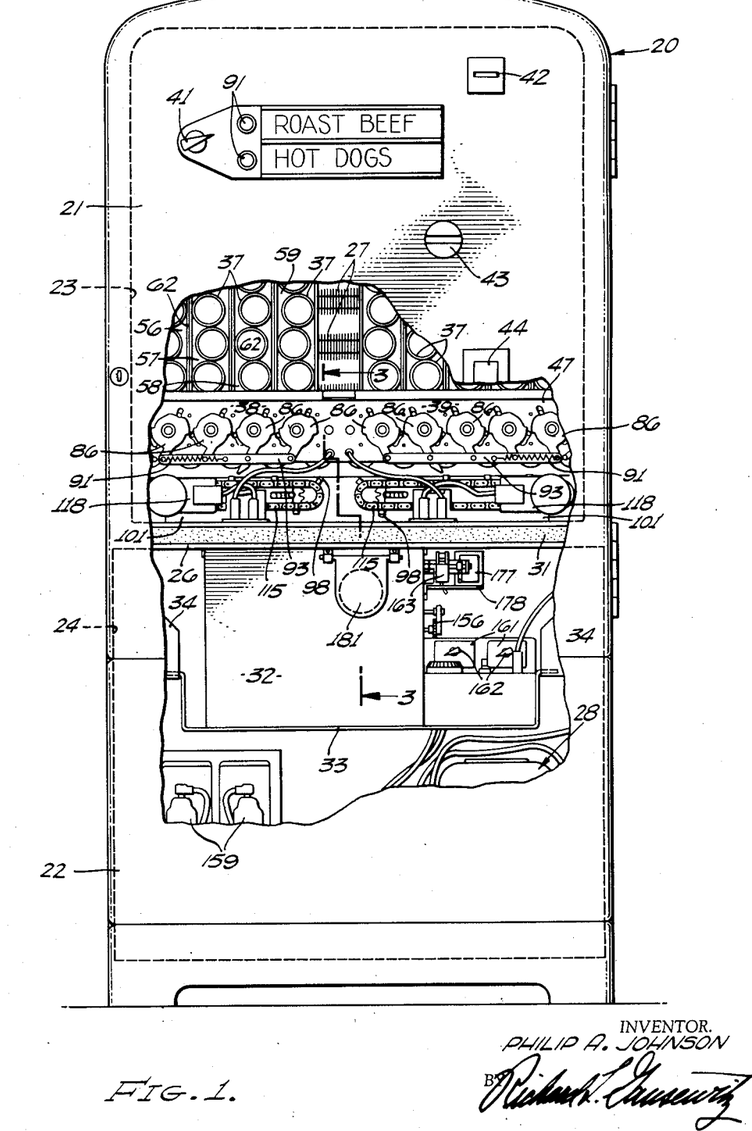
Figure 1 is a front elevational view of a sandwich vending machine constructed in accordance with the present invention, portions being broken away to illustrate certain internal components of the apparatus.
Figure 3:
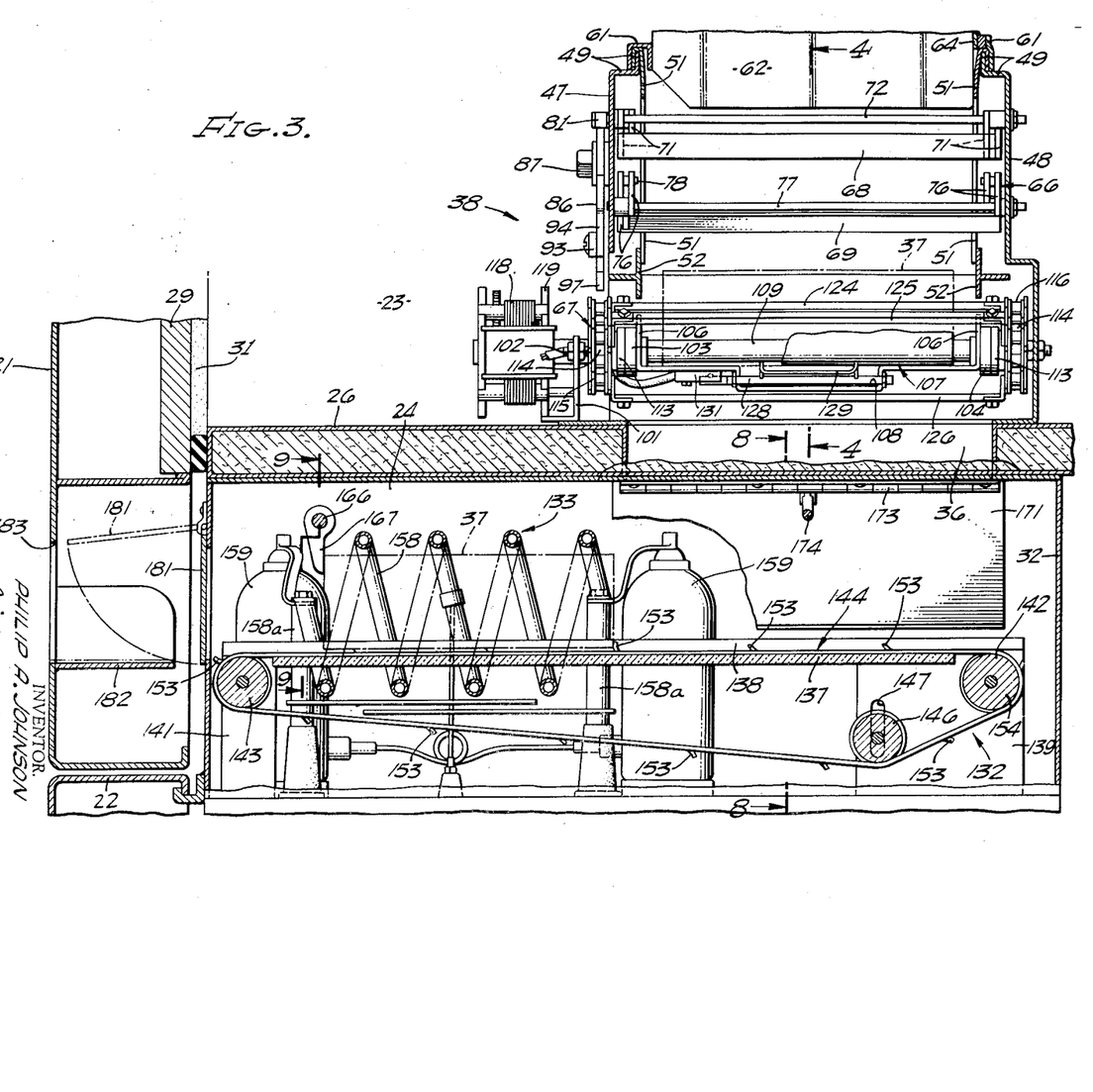
Figure 3 is an enlarged transverse fragmentary sectional view taken on line 3—3 of Figure 1, and illustrating portions of the vending means and the cooking means.

Referring first to Figure 1, the apparatus is illustrated to comprise generally a rectangular outer casing 20 having a door 21 hingedly mounted on the upper portion thereof, and a front panel 22 removably supported on the lower portion thereof. Door 21 and panel 22 together form a closure for the front of casing 20, so that a large rectangular chamber is formed within the casing As shown in Figures 1 and 3, the large chamber within casing 20 is divided into an upper storage chamber 23 and a lower cooking chamber 24 by a horizontally disposed wall or shelf means 26. Storage chamber 23 is provided with finned refrigeration tubes 27 (Figure 1) to which refrigerant is supplied from a suitable refrigerating apparatus indicated generally at 28 in the lower right portion of Figure 1. The refrigeration tubes 27 are disposed at the rear of the storage chamber 23, leaving room at the front for the storage and vending means to be described hereinafter.

The portion of door 21 above wall means 26 is formed with an insulating panel 29 (Figure 3). A suitable seal 31 is mounted on the forward edge of wall 26 and around the edge of casing 20, so that when the door is closed the seal abuts panel 29. Since wall 26 and the casing walls are also formed of a suitable insulating material, the storage chamber 23 is thus sealed and insulated against entrance of heat.

The cooking chamber 24 is further defined by a rectangular casing 32 which is preferably formed of metal, and which rests on a suitable shelf 33 (Figure 1) spaced below wall means 26. Preferably, the casing 32 is removable in order to facilitate access to the cooking means and associated components to be described below. The shelf 33 is supported on suitable brackets 34 which are secured to the interior side walls of casing 20 below wall 26.

Formed through the central portion of horizontal wall means 26, and through the adjacent upper wall portion of casing 32, is a rectangularly-shaped passage or port means 36 which provides communication between the storage chamber 23 and the cooking chamber 24. Passage or port means 36 is of a size to receive a paper cylinder 37, or other suitable container or wrapping, in which is contained a sandwich being vended by the machine. Such a sandwich may comprise, for example, a hot dog or roast beef in a bun.

The present vending machine is adapted to store, feed and cook at least two different types of sandwiches in order to provide the customer with more variety than has previously been thought practical or possible in a cooking-vending machine of the present type. More particularly, a first chute, gate and conveyor unit 38 is provided in chamber 23, to the left as viewed in Figure 1, and a second chute, gate and conveyor unit 39 is provided in such chamber to the right thereof. Unit 38 may, for example, be adapted to store and feed roast beef sandwiches, and the second unit 39 may be adapted to store and feed hot dogs.

The units 38 and 39 being identical, except that they are left and right (symmetrical about a vertical plane between the units), and except that one unit may have more columns or chutes than the other, their components have been given identical reference numerals. For purposes of simplicity of description, only the first unit, number 38, will be described in detail herein.

As will be indicated in greater detail subsequently, the customer may select which type of sandwich he desires by merely turning a selector knob 41 (Figure 1) to the sandwich of his choice. He then inserts coins totaling the price of the sandwich into a coin slot 42, which causes the machine to effect shifting of a cylinder 37 from the appropriate unit 38 or 39 through passage or port means 36 and into the cooking chamber 24, where it is cooked and then delivered to the customer. Should the customer change his mind about the purchase before he has inserted the entire number of coins required, he merely turns a coin return knob 43 to effect discharge of previously inserted coins into the coin return chute 44.

Chute and feed means in storage chamber 23

The chute, gate and conveyor units 38 and 39, which are disposed in upper storage chamber 23 forwardly of the refrigeration coils 27 and on opposite sides of the passage means 36 leading to cooking chamber 24, incorporate certain common support and guard elements which will next be described. Such elements include end support brackets 46 (Figure 2) fixedly mounted on wall or shelf means 26 at opposite ends thereof. Fixedly secured between the upper forward portions of brackets 46, and spaced above wall or shelf means 26, is a forward support plate 47 which is disposed in a vertical plane. A rear support plate 48, also fixedly secured between end brackets 46, is arranged parallel to forward plate 47 but extends down to the wall or shelf means 26 as best illustrated in Figure 3. The corresponding upper portions of support plates 47 and 48 (Figure 3) are formed with shoulders and flanges indicated at 49.

Hooked over each flange 49, and spaced inwardly away from the respective plates 47 and 48, is a guide or guard element 51 adapted to guide the cylinders 37 and eliminate any possibility of their jamming in the actuating means for gates to be described hereinafter. The lower portions of guide or guard elements 51 are lapped over additional guide or guard elements 52 which extend parallel to each other between the end brackets 46, and are fixedly secured thereto. The additional guides 52 are illustrated as being T-sectioned, and are scalloped as indicated at 53 (Figure 4) in order to provide the most efficient guiding and guarding action.

Figure 2:
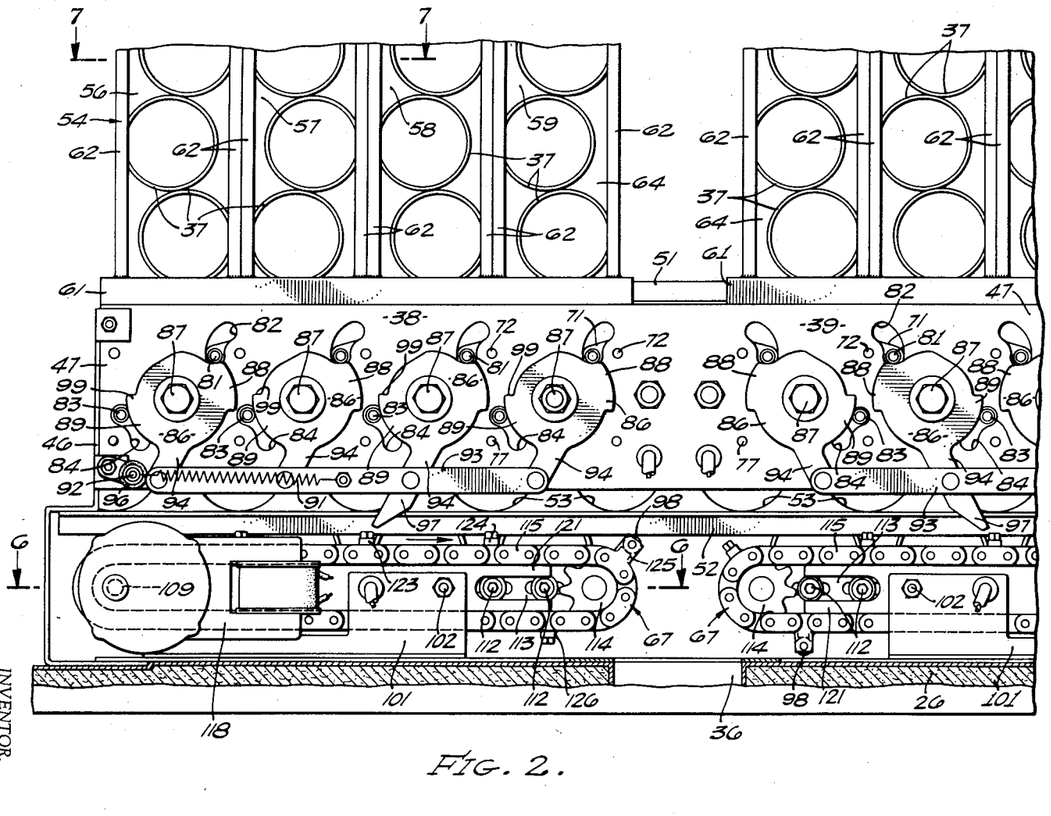
Figure 2 is a enlarged fragmentary view of the apparatus illustrated at the central portion of Figure 1.

Proceeding next to a detailed description of the first chute, gate and conveyor unit 38 (and thus, as previously stated, the corresponding unit 39), a bank 54 of laterally adjacent, vertical chutes 56—59 is mounted on forward and rear support plates 47 and 48 to the left of passage means 36 as viewed in Figure 2. More particularly, and referring to Figures 3 and 7, the bank 54 includes, at its lower end, inverted channel-like elements 61 which seat over shoulders and flanges 49 and also over the hooked or return-bent upper edge portions of guard elements 51, suitable screws or other fasteners (not shown) being employed to secure these components in position.

Mounted parallel to each other between the channel-like elements 61 are vertical dividing walls 62 which are ribbed or beaded at 63 (Figure 7) to facilitate feeding of the sandwiches therebetween. The fronts of the respective chutes 56—59 are left open for loading and so that the sandwiches may be seen therein, but the rears of the chutes are closed by a wall 64.

Figure 7:
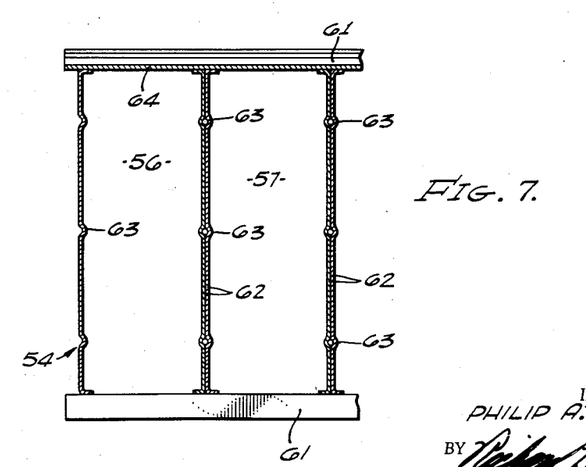
Figure 7 is a fragmentary horizontal sectional view on line 7—7 of Figure 2, illustrating the chute construction.

The chute fronts are, however, provided with suitable flanges, shown at the upper part of Figure 2 and at the lower part of Figure 7, in order to prevent axial shifting of the cylinders 37 to undesired forward positions.

In addition to the bank 54 of chutes 56—59, the unit 38 comprises gate means 66 at the lower ends of the chutes, and conveyor means 67 disposed beneath the gate means in order to receive cylinders 37 and convey the same to the opening 36 leading into cooking chamber 24.

As best illustrated in Figures 3, 4, 12 and 14, the gate means 66 comprises upper gates 68 and lower gates 69 for each chute, and taking the form of cross bars arranged between the forward and rear support plates 47 and 48. Upper gates 68 are mounted, respectively, on levers 71 which are pivoted at 72 to the support plates 47 and 48, each pair of upper gate levers being centrally connected to each other by means of a pin 73 in a slot 74. The lower gates 69 are mounted on levers 76 which are pivoted at 77 to the support plates, and are associated with each other by means of a pin 78 in a slot 79.

One of the two upper gate levers 71 for each chute has mounted thereon a cam follower 81 which projects forwardly through an arcuate slot 82 in forward support plate 47. A cam follower 83 is also provided on one of the lower gate levers 76 for each chute, and projects through a second arcuate slot 84 in the forward support plate. The cam followers 81 and 83 for each chute and set of gates are not, however, disposed one above the other but instead are mounted on opposite gate elements so that they may come into engagement with diametrically opposite portions of cam elements 86 to be described subsequently.

The pivots 72 and 77 preferably comprise rods (Figure 3) extended between and through the forward and rear support plates 47 and 48. Each pivot rod serves to mount four gate levers, namely a forward and rear gate lever for the chutes on both sides of each rod.

The cam elements 86 are suitably journaled at 87 for rotation in a plane parallel to and forwardly of support plate 47, the journal elements 87 being connected to such support plate. The cam element for each chute is disposed between pivots 72 and 77, and includes first and second raised portions 88 and 89 adapted, respectively, to bear against the cam followers 81 and 83 for such chute. When the cam elements 86 are in their normal positions, shown in Figures 2, 4, 11 and 12, cam followers 81 rest in depressed cam portions upwardly of portions 88, whereas the cam followers 83 are engaged against raised portions 89. The upper gates 68 are then open, and the lower gates 69 closed, so that the stack of cylinders 37 in each chute is resting on the lower gates as shown in Figures 2 and 12.

The cams 86 are held in the above-described normal positions by means of a tension spring 91 which is secured at one end to a bolt 92 fixed adjacent end support bracket 46, and is secured at the other end to the midportion of a horizontal connecting rod or link 93. The rod or link 93 is, in turn, pivotally connected to a depending arm portion 94 of each cam 86, so that all of the cams are rotated to corresponding positions when the spring 91 serves to shift the left end of connecting link 93 (Figure 2) against a stop element 96 on bolt 92.

The depending arm portion 94 of one of the cams 86, namely the one below chute 58 (second from the center) as viewed in Figure 2, is extended below link 93 as indicated at 97, and is shaped to perform a cam-follower function. As will be described in detail subsequently, extension 97 is adapted to be engaged and shifted by a cam operator or actuator 98 which forms a part of the conveyor means 67, the relationship being such that when actuated all of the cams 86 will be shifted from the positions shown in Figures 2, 11 and 12 to the positions shown in Figures 13 and 14. Counter clockwise rotation of the cams 86 is thus effected, as viewed from the front of the machine, and the first raised cam portions 88 are caused to ride beneath the cam followers 81 associated with the upper gate levers 71.

Figure 14:
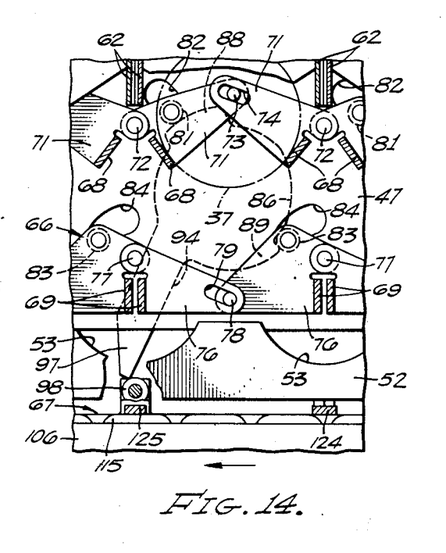
Figure 14 is another view looking outwardly from the inside of the mechanism, the parts being in the positions shown in Figure 13.

The cam construction is such that the upper gates close fully, to the positions shown in Figure 14, before the second raised cam portions 89 have moved from beneath the cam followers 83 associated with lower gate levers 76. A relatively slow opening of the lower gates 69 thereafter results as the cam operator 98 pushes against the extension 97, and as the cam followers 83 ride slowly around a sharp drop 99 at one end of each of the raised portions 89. When the lower gates have opened sufficiently, the lowermost cylinder 37 below each chute 56—59 will drop onto the conveyor means 67, but the remaining cylinders in the chutes will be held up by the now-closed upper gates 68.

Figure 11:
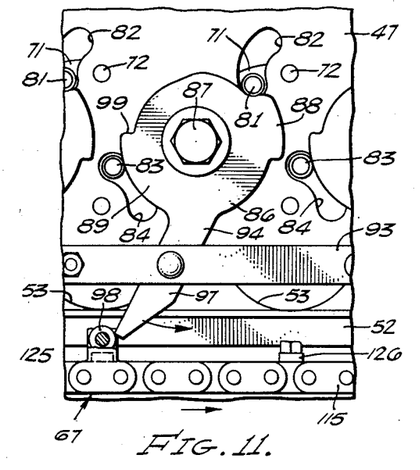
Figure 11 is an enlarged fragmentary front elevational view illustrating the third cam from the left as viewed in Figure 2, the cam position being the normal one assumed between vending cycles.
Figure 12:
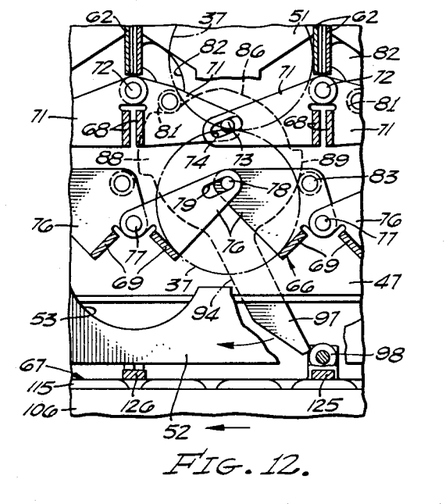
Figure 12 corresponds to Figure 11 as to positions and elements, but is a view looking outwardly from the inside of the mechanism so that the parts and directions appear reversed when compared to Figure 11.

As soon as the cam operator 98 has ridden beneath extension 97, the spring 91 will effect conjoint clockwise rotation of the cams 86, as viewed from the front of the machine, to return them to their initial positions as shown in Figures 2, 11 and 12. Such clockwise cam rotation first effects closing of the lower gates 69 and then effects opening of upper gates 68, the latter operation permitting dropping of the cylinders 37 onto the now-closed lower gates. The parts are thus returned to the initial or normal positions and will remain there until a subsequent vending cycle.

It is pointed out that the components of each set of gates are spaced well apart even when the gates are fully closed. Also, the diameters of cylinders 37 and the vertical spacing between the upper and lower gates is correlated to cause the lower cylinders to engage and support the adjacent upper ones even when the upper gates are closed. Thus, when the upper gates 68 first close they do not come into engagement with the cylinder 37 immediately thereabove, such cylinder instead resting on the lowermost cylinder 37 which is supported by the closed lower gates 69. It is not until the lower gates 69 open that the remaining cylinders 37 (above the lowermost one) drop onto the now-closed upper gates 68. Similarly, the above-described closing of the lower gates 69 is effected before opening of upper gates 68, whereby the lower gates are fully closed before the stack of cylinders 37 drops thereon.

The weight of the cylinder stacks is, accordingly, never lifted by the gates. This means that the amount of resistance to rotation of cams 86 will be a minimum at all times, so that the conveyor means 67 which operates the cams 86 may be driven by very small and inexpensive motor means.

It is also pointed out that only one spring-bias means, number 91, need be employed for the gate mechanism. The gates and gate levers are so constructed, as illustrated, that the cam followers 81 and 83 will always bear, by gravity, against portions of their cams 86, there being no necessity for providing additional spring-bias means, positive cam elements, etc.

Proceeding next to a description of the conveyor means 67, and referring particularly to Figures 2–4 and 6, these means are supported at their front by a plate or bracket 101 which is fixedly secured in upstanding relationship on the wall or shelf means 26, and at their rear by the lower portion of rear support plate 48. Bolts 102 (Figure 6) extended through plates 48 and 101 serve to mount, in inwardly spaced relation therefrom, relatively thick parallel bars 103 and 104 which are arranged horizontally and perpendicular to the positions of cylinders 37 in their chutes. Bolts 102 also support, inwardly adjacent the bars 103 and 104, the vertical side flanges 106 of a pan 107 which serves to support the cylinders 37 after they are dropped out of the above-described gate means 66. A recess or well 108 is formed in the bottom of pan 107, and parallel to side flanges 106, in order to receive switch or actuator elements as will be described subsequently.

The left ends of bars 103 and 104, as viewed from the front of the machine, are adapted to receive bearing portions of a drive shaft 109 having sprockets 111 at each end portion thereof. The right ends of the bars 103 and 104 are adjustably connected, by means of screws 112, to slide plates 113 having sprockets 114 journaled thereon. Forward and rear chains 115 and 116, respectively, are mounted parallel to each other around the respective sprockets 111 and 114, it being understood that the chains may be adjusted as to tightness by means of the slide plates 113 and screws 112. The chains are driven from drive shaft 109, through sprockets 111, by means of a relatively small electric motor 118 which is mounted on a plate 119, forwardly of bracket 101, and is drivingly connected to an extension of shaft 109. The direction of motor rotation is such, with relation to unit 38, that the chains will rotate clockwise when viewed from the front of the machine.

Figure 6:
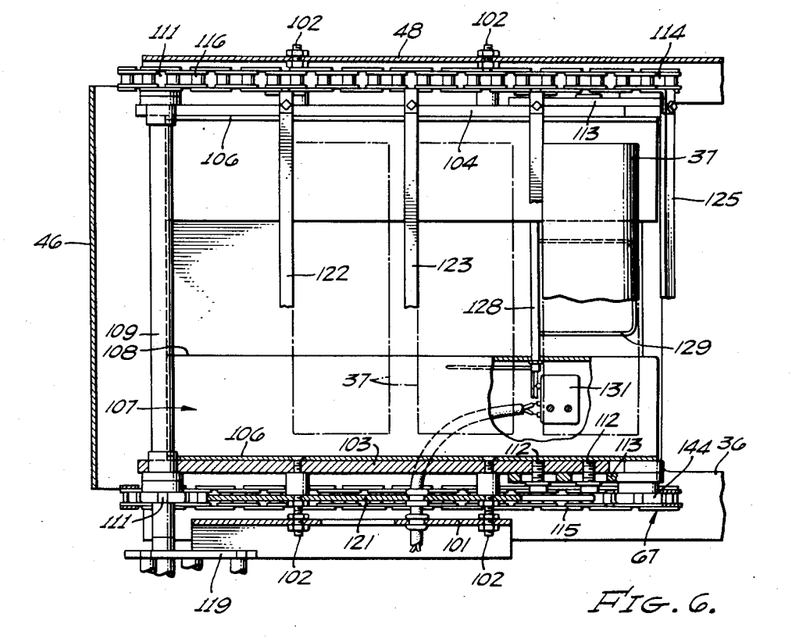
Figure 6 is a horizontal sectional view taken on line 6—6 of Figure 2, illustrating the transverse conveyor which is disposed beneath each bank of chutes.

One of the links of forward chain 115 is connected to the cam operator or actuator 98 previously described, and is so related to the extension 97 of one of the cam arms 94 that the cam operator will ride first against and then beneath the extension 97 as above stated. In order to prevent cocking of the forward chain 115 due to engagement of cam operator 98 with extension 97, a chain guide 121 is provided between the upper and lower sections of the forward chain and relatively adjacent thereto. Chain guide 121 is, as best shown in Figure 6, suitably supported on intermediate portions of the forward bolts 102.

Suitably connected between corresponding links of the forward and rear chains 115 and 116, and extending in laterally spaced relationship parallel to the cylinders 37 when in their chutes, are a plurality of pusher or roller bars 122—126. These bars are each adapted to bear against the side of cylinder 37 and roll the same along the bottom wall of pan 107, above the recess or well 108, until discharge is effected into the outlet port or passage 36 adjacent which the pan terminates. In a unit in which there are four chutes, as in unit 38, there are preferably five bars 122—126 disposed in equally spaced relationship and separated by a distance greater than the diameter of a cylinder 37. Four equal spaces between the bars are thus formed, one for each of the cylinders 37 which are simultaneously discharged from the gate means.

Since the extension 97 is mounted on the cam 86 which is spaced one chute away from passage or port 36, the third bar 125 from left bar 122 (as viewed, Figure 2, when the bars are on the upper portion of the chain) is mounted on the same link as the cam operator 98.

Figure 13:
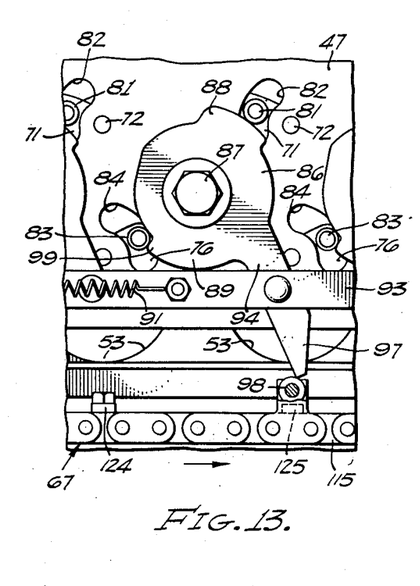
Figure 13 is a view corresponding to Figure 11 but showing the parts in their actuated positions at which sandwich feeding occurs.

It follows that when the chain 115 has rotated clockwise for a distance sufficient to effect shifting of extension 97 from the position shown in Figure 11 to that shown in Figure 13, there will be one pair of bars 122—126 beneath each chute 56—59. Since the lower gates 69 do not open sufficiently to discharge bottom cylinders 37 until the position shown in Figures 13 and 14 is approached, it follows that such cylinders will drop into the spaces between the respective pusher or roller bars 122—126 as is desired. Subsequent driving of the chains 115 and 116 by motor 118 will then effect rolling of the cylinders 37 along the pan for sequential discharge into and through outlet opening 36.

Mounted in the trough or recess 108 in pan 107 is a pivot rod 128 (Figures 3 and 6) which is journaled in the side walls of the trough. A U-shaped actuator 129, connected as a crank on rod 128, is disposed in the trough or recess directly below the chute 59 which is adjacent opening 36. The shape of actuator 129 is such that it will effect rotation of a pivot rod 128 any time a cylinder 37 is disposed beneath chute 59, thus operating a switch 131 (Figures 3 and 6) which is associated with the drive motor 118 as will be described hereinafter. The relationship between switch 131 and the drive motor is such that engagement of actuator 129 by a cylinder 37 will effect stopping of the drive motor.

It is a feature of the invention that the chute sizes, gate sizes, spacings between bars 122—126, etc., are all large relative to the sizes of cylinders 37. Thus, it will be noted upon reference to Figure 2 that the cylinders in the chutes do not stack perfectly vertically but instead in a zig-zag relationship, and upon reference to Figure 6 that there is a substantial space between each cylinder and a push bar forwardly thereof. This means that a substantial variation in the sizes of the cylinders 37 will not effect jamming or misoperation of the machine. In fact, and as before indicated, sandwiches may be vended from the present machine without being inserted in cylinders, it being merely necessary to wrap them in paper. In such instances the sandwiches are slid instead of rolled along the bottom wall of pan 107.

To summarize briefly the operation of the first chute, gate and conveyor unit 38 (and thus its corresponding unit 39), the sandwiches in their cylinders 37 are loaded into the chutes 56—59 from the top, it thus being assured that the newest or freshest sandwiches will be disposed farthest from the gate means and that the oldest (previously loaded) sandwiches will be vended first. Assuming, however, that the machine has just been loaded after being empty, the cams 86 and gates will be in the positions shown in Figures 2, 11 and 12, the upper gates 68 being open so that the stack of cylinders 37 in each chute will rest upon the closed lower gates 69. Operation of motor 118 then effects clockwise driving of forward and rear chains 115 and 116, as viewed from the front of the machine, which eventually causes the cam actuator 98 to reach the position shown in Figure 11. Upper gates 68 are then closed (as the actuator moves to the right) due to operation of cam portion 88 and cam follower 81. Lower gates 69 are subsequently opened, by elements 89 and 83 (as the actuator approaches the position shown in Figures 13 and 14), sufficiently to effect discharge of the lowermost cylinder 37 below each chute 56—59. Four cylinders 37 then drop onto pan 107 between the respective push bars 122—126. The cylinder 37 below central chute 59 drops onto the actuator 129 for switch 131, opening the latter and effecting deenergization of motor 118 to stop the conveyor drive. The parts thus come to rest in the positions shown in Figures 13 and 14, with the upper gates 68 closed and the lower gates 69 open.

Upon starting of a vending cycle due to coin-insertion as will be described hereinafter, motor 118 is again energized to effect further clockwise movement of chains 115 and 116. Cam actuator 98 then rides from beneath extension 97, permitting spring 91 to shift connecting link 93 to the left and return all of the cams 86 to their initial positions as shown in Figures 2, 11 and 12. The lower gates then close and the upper gates open to permit falling of each stack of cylinders onto the lower gates.

The chain movement also causes bar 125 to roll a cylinder 37 off of pan 107 and through opening 36, after which bar 124 rolls the next adjacent cylinder 37 onto actuator 129 to again effect cessation of motor operation. This intermittent drive operation is repeated until all four of the previously dropped cylinders 37 have been rolled sequentially off of the pan and through port or opening 36. After the fourth cylinder has rolled off of the pan, the motor 118 will continue operating until actuator 129 is again engaged by a cylinder 37, but this will not occur until cam operator 98 has engaged extension 97 and effected a repetition of the above-described cycle.

From the above it will be understood that a sandwich cylinder 37 is always disposed on actuator 129 (directly beneath central chute 59) between vending cycles, and that a very short movement of the chains will effect shifting of such cylinder 37 through opening 36 into the cooking chamber 24. It follows that substantially the entire time required for vending cycle is taken up by the cooking, and very little for the feeding or conveying prior to cooking. It is pointed out that the relatively long shifting motion which takes place subsequent to feeding of the fourth cylinder 37 through port 36 all takes place during the necessary cooking period, and that there is no wasted time due to the necessity of discharging four additional cylinders from the gates onto the pan.

Figures 4, 5:
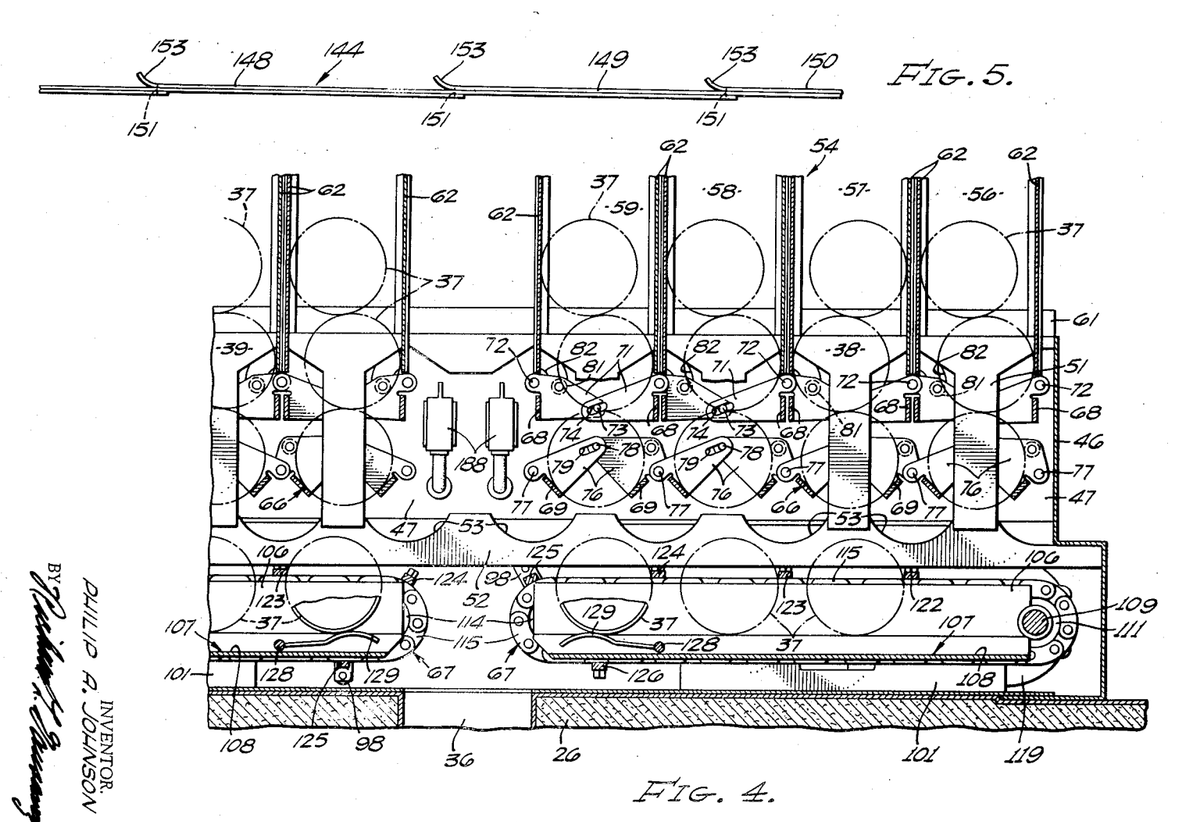
Figure 4 is a fragmentary section taken on line 4—4 of Figure 3, and looking outwardly (forwardly) as indicated by the arrows, the gates being shown in their normal positions which are assumed between vending cycles.
Figure 5 is an enlarged fragmentary elevation of the feeding belt, shown in Figure 3, which feeds the sandwiches into and through the cooking means.

The guide or guard elements 51 and 52 insure that the cylinders 37, when dropping from the gates onto the pan, will not jam or stick in any of the gate operating mechanism. Thus, as shown in Figures 3 and 4, downwardly extending finger portions of guard 51 (directly beneath each chute) lap over the scallops 53 of guard 52 to prevent axial shifting of the cylinders 37 into the gate operating mechanism, and to prevent any catching or sticking whatsoever.

*Feed and cooking means in cooking chamber 24*

Proceeding next to a description of elements in and near the cooking chamber, feeding or conveying means 132 are provided to receive the individual cylinders 37 and convey the same forwardly through a cooking means 133 for discharge to the customer. Feeding means 132 comprises a trough or guide unit which is suitably mounted on a horizontal shelf 136 in casing 32. More specifically, an insulating trough 137, having inclined side flanges 138 is supported by means of brackets 139 and 141 on opposite sides of cooking means 133 (Figure 3). The trough 137 is formed of a substance, such as polystyrene, which is a good electrical insulator and will not melt during the cooking process.

Pulleys 142 and 143 are mounted, respectively, in the brackets 139 and 141 and are adapted to support a continuous conveyor belt 144. An idler pulley 146 is mounted in rear bracket 139, beneath the level of the drive pulley 142 in the rear bracket, and is adapted to be shifted in a vertical slot 147 in such bracket in order to adjust the tightness of belt 144. Pulleys 142 and 143 are so located that the upper section of belt 144 will move along the bottom wall of trough 137, and the lower or idler pulley 146 is so located that the lower portion of the belt will be disposed beneath cooking means 133.

Referring to Figure 5, belt 144 is a special one which has a high electrical resistance, being formed of elasticized nylon fabric. The belt is formed of corresponding short sections 148, 149, 150, etc., each of which underlaps approximately half of one adjacent section and overlaps half of the other adjacent section. The end of each upper section, where any three sections are joined by nylon thread at 151, projects upwardly and forwardly at 153 to form a pusher tab which operates to bear against the rear end of a cylinder 37 and prevent rearward shifting thereof on the belt. The described relationship of sections 148—150, etc., is such that there is a three-layer belt at each joint 151 and a two-layer belt between joints.

The shaft 154 for drive pulley 142 extends through a side wall of casing 32 and is connected to gearing 156 (Figure 8) driven by an electric motor 157. Motor 157 rotates in such direction that the upper portion of belt 144 will be driven forwardly to convey cylinders 37 into and through the cooking means 133.

Cooking means 133 comprises a helical coil 158 the lower portion of which is disposed beneath belt 144 and trough 137, and the upper portion of which is disposed above the belt by a distance sufficient to receive a cylinder 37. Coil 158 (which is supported on posts 158a) is adapted to cook the sandwich by inductance, being connected to electronic circuit elements 159 which need not be described in detail herein. Briefly stated, however, the coil 158 is connected in what amounts to the tank circuit of a short wave transmitter.

Figure 8:
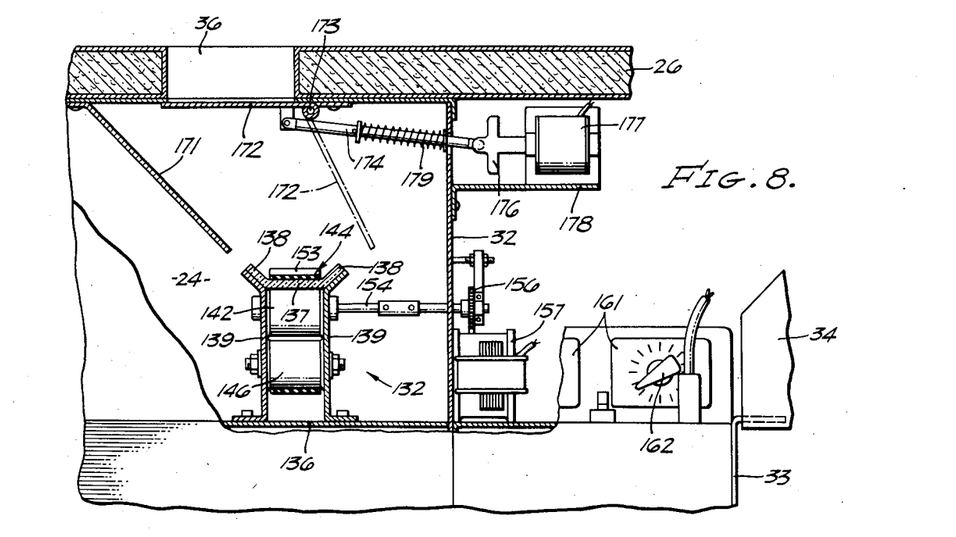
Figure 8 is a vertical fragmentary sectional view on line 8—8 of Figure 3.

The circuit elements 159, and also other units as will be described below, are connected to an electronic timer 161 (one for each unit 38 and 39) as shown at the right in Figure 8. Each timer 161 is adapted, with an adjustment knob 162, for adjustment to various time settings depending upon the type of sandwich being cooked.

A switch 163 is mounted on the side wall of casing 32 (Figures 9 and 10) and is provided with an actuator 164 which engages an enlarged portion of a shaft 166. The shaft 166 extends rotatably through the casing wall and terminates forwardly of coil 158 (Figure 3), where it is provided with a high-resistance crank 167 adapted to be engaged by the upper portion of a cylinder 37 in the coil. A weight 168 is mounted on shaft 166 (Figure 9) and is adapted to maintain the crank 167 at a predetermined position when it is not engaged by a cylinder 37.

A flat 169 in the large shaft portion (Figure 10) is adapted through actuator 164 to operate switch 163 in accordance with the position of crank 167. Switch 163 is associated with the motor 157 for belt 144, and is so constructed that the motor 157 will operate until the cylinder 37 engages crank 167 and pushes it a slight distance. Motor 157 will then cease to operate and the cylinder will be stationary during the cooking period. Thereafter, motor 157 is re-energized through a different circuit, and causes the cylinder 37 to ride beneath crank 167. As soon as the cylinder has passed completely beneath the crank, the weight 168 effects return rotation of the shaft to a position effecting (through switch 163) stopping of the motor 157.

To summarize the operation of the feeding means 132 and cooking means 133, and to describe the remaining elements in and adjacent cooking chamber 24, a cylinder 37 dropping into port or opening 36 (Figure 8) will fall against an inclined chute or slide 171 and will roll onto the portion of belt 144 (above trough 137) to the rear of cooking means 133 (Figure 3). This is only possible, however, when a door means 172 beneath opening 36 is in the fully open position shown in phantom lines in Figure 8. The door means is hinged at 173 to the bottom of wall or shelf 26, and is connected by a link 174 to the plunger 176 of a solenoid 177, the latter being suitably mounted on a bracket 178 on casing 32. A compression spring 179 is provided around link 174 to urge the door 172 to closed position at all times except when the solenoid is energized. Door means 172 serves to prevent excessive heating of the refrigerated chamber 23 as a result of heat generated in cooking chamber 24. It also serves, when open, to guide sandwiches onto the conveyor belt.

After it falls on the belt 144, the cylinder 37 is conveyed forwardly into cooking means 133 where it stops, after engaging crank 167, for cooking as previously indicated. Upon completion of cooking, the cylinder 37 is conveyed forwardly out of cooking means 133, and engages and opens a trap door 181 (Figures 1 and 3) in the forward wall of casing 32. The cylinder then comes to rest on a chute 182 formed in the lower portion of door 21, it being understood that motion of cylinder 37 is stopped as soon as crank 167 is disengaged. An opening 183 is provided in the door 21 adjacent chute 182, so that the cooked sandwich may be withdrawn by the customer.

*Controls*

Figure 15:
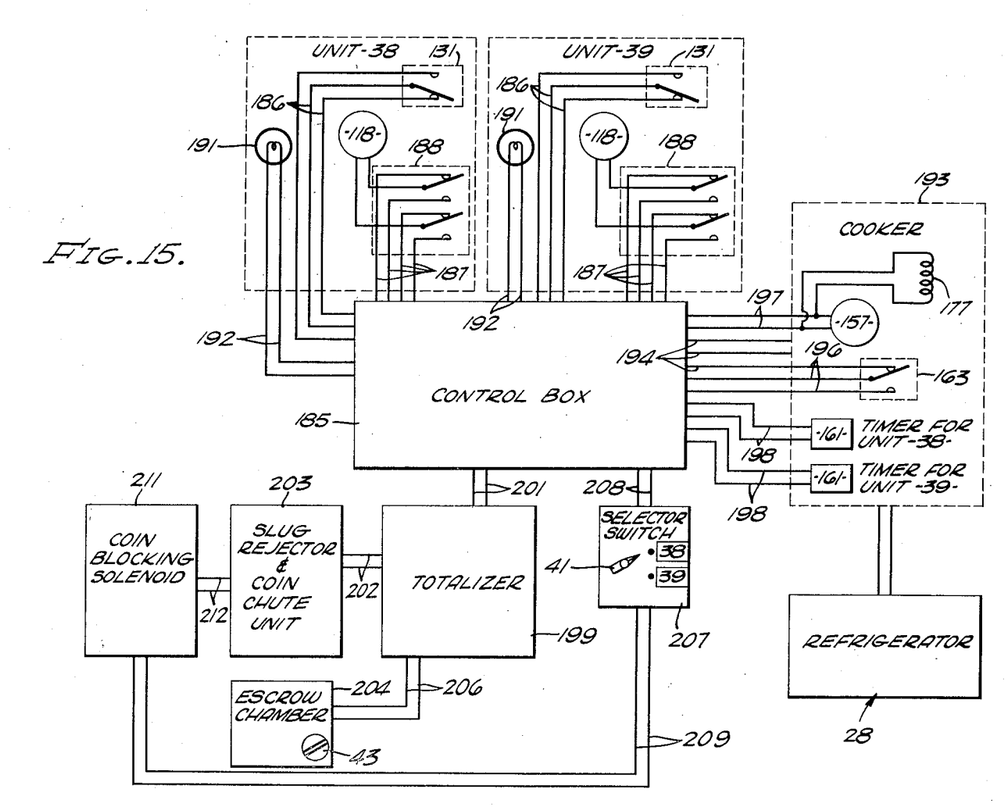
Figure 15 is a schematic diagram illustrating electrical and control elements of the machine.

Certain control and drive elements, namely motors 118 and 157, switches 131 and 163, solenoid 177, timers 161, etc., have been described in the foregoing portion of the specification. Additional control elements will now be described with reference to the schematic diagram shown in Figure 15.

The additional control elements include a control unit 185, which comprises a substantial number of relays and other controls which will not be described in detail herein. The first and second chute, gate and conveyor units 38 and 39 are associated with control unit 185 through leads 186, with reference to switches 131, and through leads 187 with reference to manual control switches 188. Switches 131 of the respective units are adapted to operate their associated conveyor motors 118, as previously indicated, when switches 188 are in the illustrated positions. The manual control switches 188 (Figure 4) are also adapted to operate the conveyor motors 118, being connected thereto as shown, during loading of the hopper chutes. Thus, during loading of the units 38 and 39 the operator merely presses the switches 188 to effect energization of motors 118 and, accordingly, driving of the conveyor means 67 until a cylinder 37 for each unit is in the desired position on U-shaped actuator 129.

Empty lights 191 (Figures 1 and 15) are provided adjacent selector knob 41 and are adapted, respectively, to be energized when the associated unit 38 or 39 is empty. These lights are connected through leads 192 to the control 185.

The cooking elements are indicated in the box 193, and include the cooking coil 158 and the electronic circuit elements 159 previously referred to. Box 193 is connected to control unit 185 by means of leads 194.

The switch 163 associated with cooking coil 158 is shown as connected by leads 196 to the control unit 185. Leads 197 connect the control unit 185 to motor 157 of the cooking elements, such motor being in parallel with trap-door solenoid 177 so that the solenoid is always energized (and the door opened) when motor 157 is running. The timers 161 for units 38 and 39 are connected by leads 198 to the control unit.

Refrigerator 28 is associated with the cooking elements 193, and thus with control unit 185, in such manner that the refrigerator is turned off when cooking is taking place. This means that the maximum amount of power available in the supply source may be employed for cooking.

This is important since the present apparatus is designed to operate on a conventional 110 volt circuit, which is highly convenient for vending machine operation as compared to special 220 volt circuits.

A totalizer 199 is connected by means of leads 201 to control unit 185. The totalizer operates to add the values of the coins inserted in coin slot 42 (Figure 1) and initiate the vending cycle after sufficient coins have been inserted.

The totalizer is associated through leads 202 with a slug rejector and coin chute unit 203 which may be of conventional construction adapted to reject slugs, and to send coin signals (such as by coin switches) to the totalizer 199.

An escrow device 204 is connected by leads 206 to totalizer 199. Such device is adapted to store inserted coins until a sufficient number of coins has been inserted to initiate the vending cycle, at which time all the coins are fed into the coin storage box of the apparatus. At any time prior to insertion of sufficient coins, the previously inserted coins may be returned to the customer by turning the previously described knob 43. When knob 43 is turned, the totalizer 199 is reset to zero, so that upon a subsequent vending cycle the total required value of coins must be inserted. An escrow device is described in my co-pending application Serial No. 637,153, filed January 30, 1957, for an Escrow Device for Coin Operated Mechanisms.

The selector switch is indicated at 207 and is, as previously described, operated by a knob 41 in order to determine which of the units 38 or 39 will be operated. Selector switch is connected by leads 208 to control unit 185, and by leads 209 to a coin blocking solenoid 211, the latter being associated through leads 212 with slug rejector 203.

The coin blocking solenoid 211 is adapted to effect return of any inserted coins unless the apparatus is energized. Stated otherwise, any time that the coin blocking solenoid is de-energized, all coins inserted into the apparatus will be immediately transferred to the coin-return chute 44. The coin-blocking solenoid is de-energized not only when the entire apparatus is de-energized, but also when selector knob 41 is turned to effect vending from a unit 38 or 39 which is empty. Thus, when the knob 41 is turned to unit 38, for example, any coins inserted will be returned to the customer. The coin-blocking solenoid is also de-energized during a vending cycle.

Summary of operation

Let it be assumed that the vending apparatus is completely empty, and that the cams 86 and gate elements are in the positions shown in Figures 1–4, 11 and 12. The bottom gates 69 are thus closed, and the top gates 68 are open.

The operator of the apparatus then loads a stack of cylinders 37, containing sandwiches, into the chutes 56—59, etc. As previously stated, the unit 39 may contain sandwiches such as hot dogs, and the unit 38 sandwiches such as roast beef. After the stacks are inserted in the respective chutes, the operator closes manual switches 188 (Figures 4 and 15) for the respective units 38 and 39, which operates through the motors 118, chains 115 and 116, cam actuators 98, etc., to effect feeding of the cylinders 37 through the gate means 66 onto the conveyor means 67 until one cylinder is in position beneath the central chute (numbered 59 in the case of unit 38). The machine is thus ready for operation, and the sandwiches are stored in cold condition due to the operation of refrigerator 28 and finned refrigeration tubes 27.

When a customer desires to purchase a sandwich, he turns selector knob 41 to the desired position. In the following description it is assumed that the knob has been turned to the position resulting in operation of the unit 38, it being understood that the operation is the same relative to unit 39. The customer then inserts sufficient coins into slot 42, causing totalizer 199 to initiate the vending cycle. Control unit 185 then operates to energize motor 118 of unit 38, start operation of timer 161 for unit 38, energize motor 157 and solenoid 177, reset the totalizer 199 for a subsequent vending cycle, empty the escrow device 204 of coins, and de-energize coin blocking solenoid 211. The latter operation prevents insertion of additional coins during the vending cycle.

Because of the above-described energizations, chains 115 and 116 for unit 38 are driven, by shaft 109 and sprockets 111, to effect clockwise movement of the chains as viewed from the front of the machine. Also, door 172 is opened (Figure 8), and conveyor belt 144 in the cooking chamber 24 is driven forwardly.

The operation of the chains 115 and 116 effects, through push bar 125, rolling of the cylinder 37 off pan 107 and through port or opening 36. The chain movement continues until the next adjacent cylinder 37 is rolled along the pan and onto actuator 129 for switch 131, which switch is then operated to effect de-energization of motor 118 and cessation of the chain drive.

Figure 9:
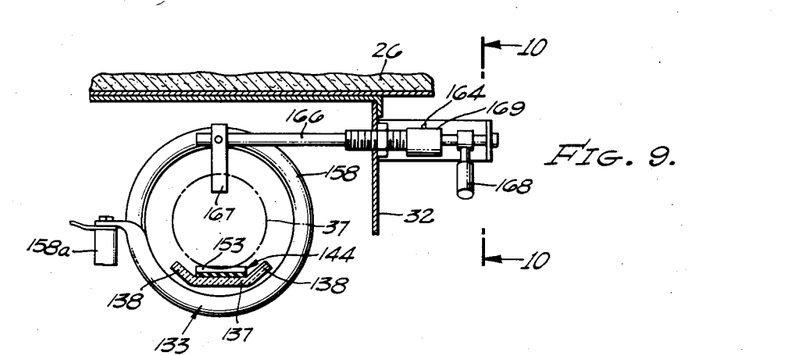
Figure 9 is a vertical fragmentary sectional view on line 9—9 of Figure 3.
Figure 10:
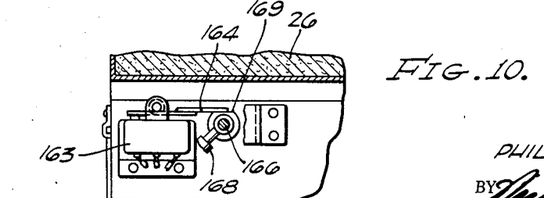
Figure 10 is a fragmentary sectional view taken on line 10—10 of Figure 9, and illustrating the switch means which determines the position of the sandwich in the cooker and the movement of the sandwich therethrough.

The cylinder 37, upon falling through opening 36, rolls down slide 171 (Figure 8) and onto belt 144 to the rear of cooking coil 158 (Figure 3). Belt 144 immediately conveys the cylinder 37 into cooking coil 158, until the forward end of the cylinder engages crank 167 and thus operates switch 163 (Figures 9 and 10). When switch 163 is thus actuated, it operates to effect energization of cooking coil 158, stop operation of refrigerator 28, and stop operation of motor 157 and thus of the drive for belt 144.

At the end of a predetermined time period governed by the timer 161, which time period commenced to run at the same time the vending cycle started, motor 157 for belt 144 is again energized independently of switch 163. The cylinder 37 is then conveyed forwardly by conveyor belt 144 out of cooking coil 158 and until the crank 167 is cleared. Switch 163 then returns to its original position, which effects shutting off of the motor 157. The end of the cooked sandwich is then accessible through opening 183 (Figure 3) and is withdrawn by the customer.

In addition to the above, timer 161 operates at the end of the predetermined time period to de-energize cooking coil 158, restart the refrigerator 28, and energize coin blocking solenoid 211 so that a second vending cycle may be started. The vending cycle is then repeated, upon repeated insertion of the required number of coins into the coin slot, until all four of the initially dropped cylinders 37 have been fed by pusher or roller bars 122—126 along pan 107 and through opening 36 for conveying and cooking as above-described.

After the fourth cylinder has rolled off of actuator 129 below chute 59, the motor 118 will continue running until cam actuator 98 has moved to the position shown in Figure 11. Further movement of cam actuator 98 operates through extension 97 and link 93 to effect counterclockwise rotation of all cams 86 to the positions shown in Figures 13 and 14. This, as previously described in detail, first effects closing of upper gates 68 and then effects opening of lower gates 69, so that an additional four cylinders 37 are dropped onto pan 107 between the respective pusher bars 122—126. The sandwich 37 which falls upon actuator 29 effects operation of switch 131 and thus de-energization of motor 118 to stop the chain drive. Upon the next vending cycle, to roll the center cylinder 37 off pan 107 and through port 36, the cam actuator 98 rides beneath extension 97 and permits spring 91 to return the cams 86 to their initial positions. This permits the remaining cylinders 37 in the chutes to fall upon the lower gates, but not until the lower gates have completely closed.

Should it occur that a sandwich jams in the apparatus, so that switch 131 is not operated to de-energize motor 118, such motor will nevertheless be de-energized by the timer at the end of the predetermined time period. Thus, timer 161 controls the entire cycle, both vending and cooking, and insures that jamming of a sandwich cannot effect damage to the motor 118.

After all the sandwiches have been delivered out of a unit 38 or 39, there will be no cylinder to operate switch 131. Motor 118 will then continue to run until the end of the time period, determined by timer 161, and will then shut off, just as in a case when jamming of a sandwich occurs. This operates, through control 185 and associated units, to effect turning on of the empty light 191, and to effect de-energization of coin-blocking solenoid 211 so that any coins subsequently inserted in the coin slot (when the selector switch is turned to the empty unit) will be returned to the coin return chute.

Re-loading of the vending machine before it becomes empty merely involves inserting additional sandwiches on top of the stacks in the respective chutes. After emptying of the apparatus, re-loading is effected through use of the manual switches 188 as previously described. When a sandwich then comes to rest upon the actuator 129 for switch 131, the control unit operates to turn off the empty light 191 and to re-energize coin-blocking solenoid 211, thus readying the unit for additional automatic vending.

Various embodiments of the present invention, in addition to what has been illustrated and described in detail, may be employed without departing from the scope of the accompanying claims.

I claim:

1. In a coin-operated vending machine for vending hot, cooked sandwiches, a chute, gate and conveyor unit which comprises means to form a plurality of generally vertical chutes arranged in side-by-side relationship with their lower ends in a row, each of said chutes being adapted to receive a stack of sandwiches or like articles to be vented, upper gates provided at the lower portion of each of said chutes and adapted to block the flow of sandwiches therepast, lower gates provided at the lower portion of each of said chutes and spaced below said upper gates by a distance sufficient to receive a sandwich therebetween, cam means to operate said upper gates and lower gates for each of said chutes, conveyor means mounted below said chutes and adapted to receive sandwiches therefrom, said conveyor means having substantially spaced elements which simultaneously receive between them the sandwiches dropped from all of said chutes, means provided on said conveyor means to operate said cam means, and means to operate said conveyor means in a manner first effecting operation of said cam means to close said upper gates and thereafter open said lower gates for simultaneous discharge of one sandwich from each chute onto said conveyor means between said spaced elements, and then effecting operation of said conveyor means until a sandwich is adjacent an outlet element at one end of said conveyor means.

2. The invention as claimed in claim 1, in which said means on said conveyor means to operate said cam means is a cam-actuator on a chain portion of said conveyor means, in which means are provided on one of said cam means for engagement and operation by said cam actuator when said cam actuator moves therepast, in which means are provided to connect all of said cam means for conjoint operation, and in which means are provided to prevent cocking of said chain due to operation of said cam actuator.

3. The invention as claimed in claim 1, in which a cylinder is provided to enclose each sandwich in each of said chutes, in which said lower and upper gates are so constructed and related that the stack of cylinders in each chute will be supported by said lower gates while said upper gates are shifted to closed condition, and in which said cam means are adapted when shifted away from their initial positions to first effect closing of said upper gates and effect thereafter opening of said lower gates to permit dropping of the lower cylinder in each stack onto said conveyor means, and dropping of the remaining cylinders in each stack onto said closed upper gates.

4. The invention as claimed in claim 3, in which means are provided to effect, after said conveyor means passes a predetermined point, return movement of said cam means to said initial positions, said cam means being constructed to first effect closing of said lower gates and thereafter effect opening of said upper gates to permit dropping of the stacked cylinders onto said lower gates.

5. The invention as claimed in claim 1, in which said cam means for each chute includes a single rotatable cam associated through separate cam followers with the upper gates and lower gates for such chute, and in which said upper gates and lower gates each comprise two gates which pivot about axes located on opposite sides of said cam.

6. The invention as claimed in claim 1, in which a cylinder is provided to enclose each sandwich in each of said stacks; in which said conveyor means comprises a stationary pan, a pair of chains mounted on sprockets along opposite edges of said pan, and a plurality of pushers connected between corresponding portions of said chains and spaced apart by distances sufficient to receive one cylinder between each two adjacent pushers; and in which said means on said conveyor means for operating said cam means is so related to said pushers that one pair of pushers will be beneath each chute when said lower gates are opened to discharge cylinders from said chutes, said cylinders thereafter being rolled along said pan by said pushers for sequential discharge to said outlet element.

7. A coin-operated vending machine, which comprises means to define a storage chamber, outlet means provided in the lower central portion of said storage chamber, and a pair of chute, gate and conveyor units mounted on two sides of said outlet means for discharge therein of articles to be vended, each of said units comprising means to define a plurality of upwardly extending chutes having upper loading portions for said articles and lower discharge portions therefor, gate means mounted at the lower ends of said chutes, conveyor means mounted beneath said chutes and terminating adjacent said outlet means, means to operate said gate means to effect discharge of the lower article in each of said chutes onto said conveyor means, and means to operate said conveyor means to effect sequential feeding of said articles into said outlet means.

8. The invention as claimed in claim 7, in which means are provided to refrigerate said storage chamber, and cooking means are provided externally of said storage chamber to receive articles from said outlet means, said cooking means being adapted to cook said articles and thereafter deliver the same to a customer.

9. The invention as claimed in claim 8, in which means are provided to block said outlet means except during operation of said conveyor means, to prevent transmission of heat into said storage chamber.

10. The invention as claimed in claim 8, in which said cooking means includes an inductance coil, and conveyor means to receive articles from said outlet means and convey the same to and through said inductance coil.

11. A coin-operated vending machine for storing perishable sandwiches under refrigeration and thereafter cooking the same and vending them to a customer, which comprises an outer casing, wall means to separate said outer casing into an upper storage chamber and a lower cooking chamber, means to refrigerate said storage chamber, passage or port means provided through the central portion of said wall means and adapted to deliver sandwiches from said storage chamber to said cooking chamber, door means to block said passage or port means except during delivery of a sandwich from said storage chamber to said cooking chamber, first and second banks of laterally adjacent storage and feed chutes disposed in said storage chamber on opposite sides of said passage or port means, the end or central chute in each of said banks being relatively adjacent said passage or port means, first and second conveyors disposed beneath said respective banks and adapted to transmit sandwiches therefrom to said passage or port means, first and second gate means provided at the lower ends of the respective banks, the gate means for each bank operating to discharge simultaneously one article from each chute for such bank onto the conveyor for such bank, means to operate said gate means for each bank and to operate said conveyors for each bank, cooking means mounted in said cooking chamber, and feeding means provided in said cooking chamber to carry articles from said passage or port means to and through said cooking means for discharge to the customer.

12. The invention as claimed in claim 11, in which control means are provided to effect selective operation of the gate means and conveyors associated with said first and second banks to thus permit selection by the customer of the type of sandwich to be vended.

13. In a coin-operated vending machine, a chute, gate and conveyor unit which comprises chute means forming a plurality of upstanding chutes arranged in side-by-side relationship with their lower ends in a row, the upper portions of said chutes being adapted to receive articles to be vended, conveyor means mounted beneath said lower ends of said chutes along said row and adapted to receive articles dropped from said chutes, a gate geans mounted at the lower end portion of each of said chutes above said conveyor means and adapted when operated to effect discharge of a single article out of such chute and onto said conveyor means, said gate means in each of said chutes comprising upper and lower gates adapted to block the passage of articles therepast and spaced apart by a distance sufficient to permit a single article to be disposed therebetween, means to effect operation of all of said gate means to effect substantially simultaneous dropping of articles from each of said chutes onto different portions of said conveyor means, said means to operate said gate means including elements to effect closing of said upper gates prior to opening of said lower gates whereby said single article is discharged past said lower gates and the remaining articles are held by said upper gates, and means to operate said conveyor means to effect sequential discharge of articles from said conveyor means into an outlet means located at one end thereof.

14. In a vending machine, a cooking coil, means to supply electrical energy to said cooking coil to effect cooking of objects therein by inductance, an endless belt having a portion extended through said cooking coil, means to drive said belt to effect feeding of articles into said cooking coil, switch means in said cooking coil for operation by articles being moved therethrough by said belt, and means to effect cessation of belt operation in response to actuation of said switch means.

15. In a vending machine; a cooking coil; means to supply electrical energy to said cooking coil to effect cooking of objects therein by inductance; an endless belt having a portion extended through said cooking coil, said belt comprising a plurality of relatively short, lapped, sections of elasticized, heat-resistant synthetic fabric, the end portions of said sections being extended upwardly at joints between said sections to provide pushing elements for articles on said belt; and means to drive said belt to effect feeding of said articles into said cooking coil.

References Cited in the file of this patent

UNITED STATES PATENTS

| | | |
|---|---|---|
| 816,975 | Gilbert et al. | Apr. 3, 1906 |
| 1,383,623 | Groves | July 5, 1921 |
| 1,555,860 | Ledwinka | Oct. 6, 1925 |
| 1,734,045 | Parran | Nov. 5, 1929 |
| 1,736,107 | Addison | Nov. 19, 1929 |
| 1,741,067 | Murray | Dec. 24, 1929 |
| 1,959,327 | Adams | May 22, 1934 |
| 2,337,033 | Davies | Dec. 21, 1943 |
| 2,452,837 | Colbert | Nov. 2, 1948 |
| 2,530,680 | Burkholder | Nov. 21, 1950 |
| 2,531,238 | Tandler et al. | Nov. 21, 1950 |
| 2,623,451 | Prohaska | Dec. 30, 1952 |
| 2,713,959 | Gilbert | July 26, 1955 |
| 2,788,735 | Farace | Apr. 16, 1957 |